United States Patent [19]

Dodson, III

[11] 3,878,541
[45] Apr. 15, 1975

[54] LIQUID LEVEL LIMIT INDICATOR
[75] Inventor: George Bertram Dodson, III, Shirley, Mass.
[73] Assignee: RCA Corporation, New York, N.Y.
[22] Filed: June 13, 1974
[21] Appl. No.: 479,137

[52] U.S. Cl........... 340/244 R; 307/310; 340/228 R
[51] Int. Cl........................................... G08b 21/00
[58] Field of Search.................. 340/244 R; 307/310

[56] References Cited
UNITED STATES PATENTS
3,755,801   8/1973   Milo.............................. 340/244 R

*Primary Examiner*—Thomas B. Habecker
*Attorney, Agent, or Firm*—Edward J. Norton; Carl V. Olson

[57] ABSTRACT

Apparatus for sensing when the liquid in a tank falls below, or rises to, a predetermined level includes a plug mounted in the wall of the tank at the predetermined level. A reference semiconductor device is mounted in the plug with thermal coupling to the tank, and thus also to the liquid in the tank. A level-sensing semiconductor device and a series resistor are mounted in the plug with thermal coupling to the interior of the tank and to liquid when present at the predetermined level. A source of potential is connected to supply a current through a resistor to the reference semiconductor device, and to the level-sensing semiconductor and series resistor. A differential comparator has individual inputs connected across the respective semiconductor devices, and has an output connected to a level limit indicator such as a lamp or buzzer.

6 Claims, 3 Drawing Figures

LIQUID LEVEL LIMIT INDICATOR

The invention described herein was made in the course of or under a contract or a subcontract thereunder with the Department of the Army.

BACKGROUND OF THE INVENTION

There are many known means for sensing and generating an electrical signal when a liquid in a tank falls below, or rises to, a predetermined level. However, the need exists for a relatively very simple, very inexpensive, and ultra reliable apparatus for performing this function. Apparatus most fully satisfying the listed qualities can be expected to have widespread use in mass market products such as automobiles

SUMMARY OF THE INVENTION

A means for sensing when a liquid in a tank reaches a predetermined level includes an electrically-conductive reference semiconductor mounted to be maintained at the temperature of the tank and the liquid therein. An electrically-conducting level-sensing semiconductor device is mounted in the tank at the predetermined sensing level. When the level-sensing semiconductor is immersed in the liquid, the temperature of the two semiconductors, and the voltages thereacross, are the same. When the level-sensing semiconductor is exposed to air, it is no longer cooled by the liquid, its temperature rises, and the voltage across it falls. The relative change in voltage is detected by a semiconductor differential amplifier, from which an electrical signal sounds an alarm or causes some corrective action.

DESCRIPTION OF THE PREFERRED EMBODIMENT

Figure 1:
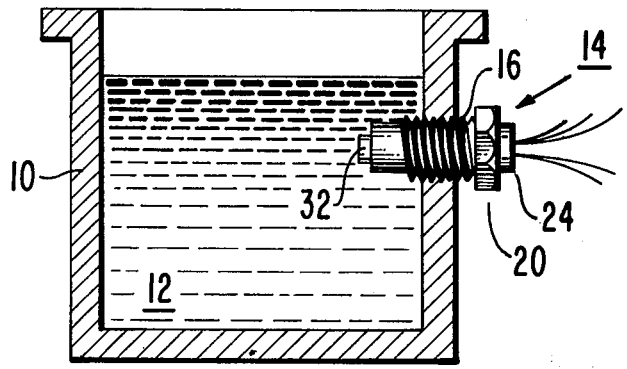
FIG. 1 is a sectional view of a tank containing a liquid and a liquid level sensing element or plug.

Referring now in greater detail to the drawing, FIG. 1 shows a tank 10, of a material such as metal, containing a liquid 12, which may be any liquid such as water, oil, gasoline, or the like. A liquid level sensing element generally designated 14 is constructed in the form of a threaded plug which is screwed into a threaded hole in the wall of tank 10.

Figure 2:
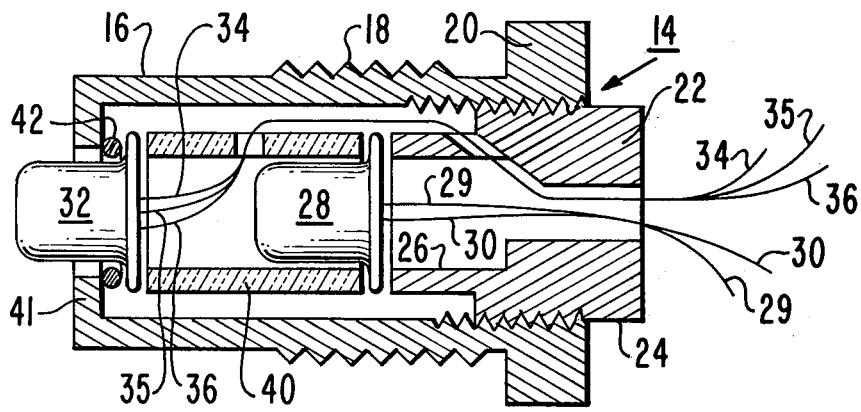
FIG. 2 is an enlarged sectional view of the liquid level sensing element included in FIG. 1.

The level sensing element or plug 14 is shown in greater detail in FIG. 2 to include a main body 16, which is threaded at 18 for an engagement with threads in a hole in the tank, and which has an integral hex nut 20. A pressure seal screw 22 is threaded into the interior of the body 16 by means of an integral hex nut 24. The pressure screw 22 is hollow to form a passageway for electric wires and is provided with a cylindrical pressure-exerting end 26.

The liquid level sensing element 14 includes a hat-like type TO-18 metal can 28 with two electrical leads 29 and 30 extending therefrom. The can 28 encloses a reference semiconductor $T_1$ to be described in connection with the circuit diagram of FIG. 3. The element 14 also includes a similar hat-like metal can 32. The can 32 has three output leads 34, 35 and 36, and includes a level-sensing semiconductor $T_2$ and a resistor $R_2$ to be described in connection with the circuit diagram of FIG. 3.

The semiconductor-enclosing cans 28 and 32 are maintained in spaced relationship by means of a spacing cylinder 40 made of a thermally insulating material. The two semiconductor-enclosing cans and the spacing cylinder (40) are firmly clamped between a flange 41 on the end of the body 16 and the end 26 of the pressure seal screw 22. A thermally-insulating, liquid-sealing ring 42 is positioned between the flange 41 of the body 16 and the flange of the semiconductor can 32. It can be seen that the construction is such that the liquid-level-sensing semiconductor can 32 is thermally insulated from contact with the main body 16 and the tank 10, and that the reference semiconductor can 28 is in thermal contact through the pressure seal screw 24 and the main body 16 with the tank 10, which in turn is in thermal contact with the liquid 12.

Figure 3:
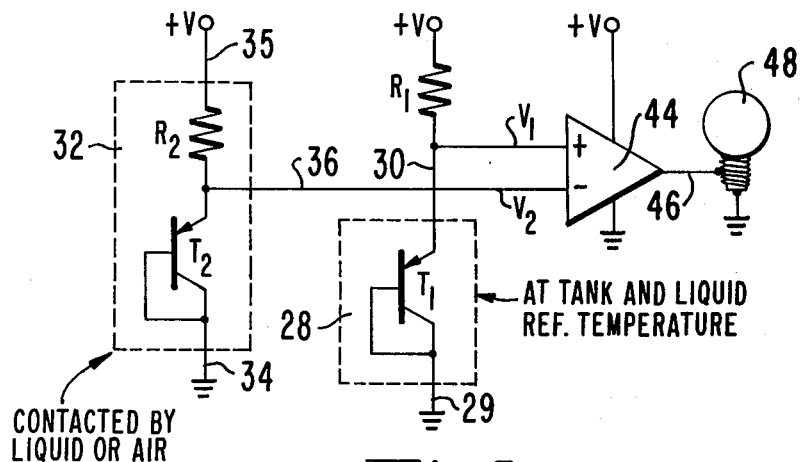
FIG. 3 is an electrical circuit diagram of a liquid level sensing system including the sensing element shown in FIGS. 1 and 2.

Reference is now made to FIG. 3 for a description of the electrical circuit of the liquid level sensing system. The reference semiconductor can 28 in FIG. 2 is shown in FIG. 3 to include a transistor $T_1$ having its base and collector electrodes connected together and connected by wire 29 to a ground or reference potential. The emitter of the transistor $T_1$ is connected over a wire 30 to a resistor $R_1$, which is in turn connected to the positive terminal $+V$ of a source of bias potential referenced to ground. The wire 30 is also connected to the positive input $+$ of a differential amplifier or differential comparator or operational amplifier 44.

The level-sensing semiconductor can 32 in FIG. 2 is shown in FIG. 3 to include a transistor $T_2$ having its base and collector electrodes connected together and connected over a wire 34 to a point of ground or reference potential. The emitter of the transistor $T_2$ is connected to a resistor $R_2$ located inside the can 32. One end of the resistor $R_2$ is connected by wire 35 to the positive terminal $+V$ of the bias potential source. The junction between the resistor $R_2$ and the transistor $T_2$ is connected by a wire 36 to the negative or phase reversing input $-$ of the differential comparator 44. The output 36 of the differential comparator 44 is connected to a signal-indicating device such as a lamp 48.

The transistors $T_1$ and $T_2$ are connected as diodes and can be replaced by diodes. The transistors may alternatively be NPN transistors having emitters connected to ground and collectors connected to resistor $R_1$ and $R_2$, respectively.

OPERATION

In the operation of the liquid level sensor, the $+V$ bias supplied to the reference and sensing semiconductors $T_1$ and $T_2$ causes the semiconductors to be continuously conductive at saturation, and to dissipate power in the respective resistors $R_1$ and $R_2$. When the liquid 12 in tank 10 is above the level of the level-sensing element or plug 14 as shown in FIG. 1, reference semiconductor $T_1$ is at the temperature of the tank 10 and the liquid 12 therein. The level-sensing semiconductor $T_2$ is immersed in the liquid and is at approximately the same temperature as the liquid. The semiconductors then have substantially equal voltage drops across them, so that substantially equal voltages $V_1$ and $V_2$ are applied to the inputs of comparator 44. However, the temperature of the sensing semiconductor $T_2$ will tend to be a little higher than the temperature of reference semiconductor $T_1$ because power-dissipating resistor $R_2$ is in the same can with the sensing semiconductor $T_2$. Therefore, the value of resistor $R_1$ is made sufficiently larger than the value of resistor $R_2$ so that, when the liquid level is high, the voltage $V_2$ is slightly larger than voltage $V_1$, the output of amplifier 44 is zero volts, and the lamp 48 is "off."

When the level of the liquid 12 in tank 10 falls below the predetermined level determined by the position of plug or element 14, the level-sensing semiconductor $T_2$ is exposed to air, and the heat generated in resistor $R_2$ is not carried away as quickly as when it is immersed in the liquid. The temperature of semiconductor $T_2$ rises, and the voltage drop $V_2$ across the semiconductor becomes less than the voltage drop $V_1$ across reference semiconductor $T_1$. These voltages applied to comparator 44 cause a +V output on line 46 which turns lamp 48 "on." The lamp stays "on" until the liquid level again rises above the predetermined level determined by the position of plug 14.

It will be understood that any other alarm or equipment-actuating means may be substituted for the lamp 48. Also, the output signal may be arranged to turn "on" when the liquid has risen above a predetermined level, instead of having fallen below a predetermined level.

What is claimed is:

1. Means for sensing when the level of a liquid in a tank passes a predetermined level, comprising
   a reference semiconductor device mounted in said tank with thermal coupling to the tank and the liquid therein,
   a level-sensing semiconductor device mounted in said tank at said predetermined level and with thermal coupling to air or liquid present in the interior of the tank,
   means to supply a current through said reference semiconductor device, and to supply a current through said level-sensing semiconductor device, and
   a differential comparator having two inputs each connected to a respective one of said semiconductor devices, and having an output producing an electrical change when the level of liquid passes said predetermined level.

2. The combination as defined in claim 1 and an electrically-operated level limit indicator connected to the output of said comparator.

3. The combination as defined in claim 1 wherein said semiconductors are transistors connected as diodes.

4. The combination as defined in claim 1 wherein resistors are connected in circuit with said semiconductors.

5. The combination as defined in claim 4 wherein the resistor in circuit with said level-sensing semiconductor is in close thermal relationship with the semiconductor, and the resistor in circuit with the reference semiconductor is remote from the semiconductor.

6. The combination as defined in claim 5 wherein said resistors have relative values which produce one binary value of output when the level-sensing semiconductor is immersed in the liquid and produce the other binary value of output when the level-sensing semiconductor is exposed to air.

* * * * *